(No Model.)
H. EDMUNDS.
DISTRIBUTION OF ELECTRICITY BY SECONDARY BATTERIES.
No. 393,147. Patented Nov. 20, 1888.
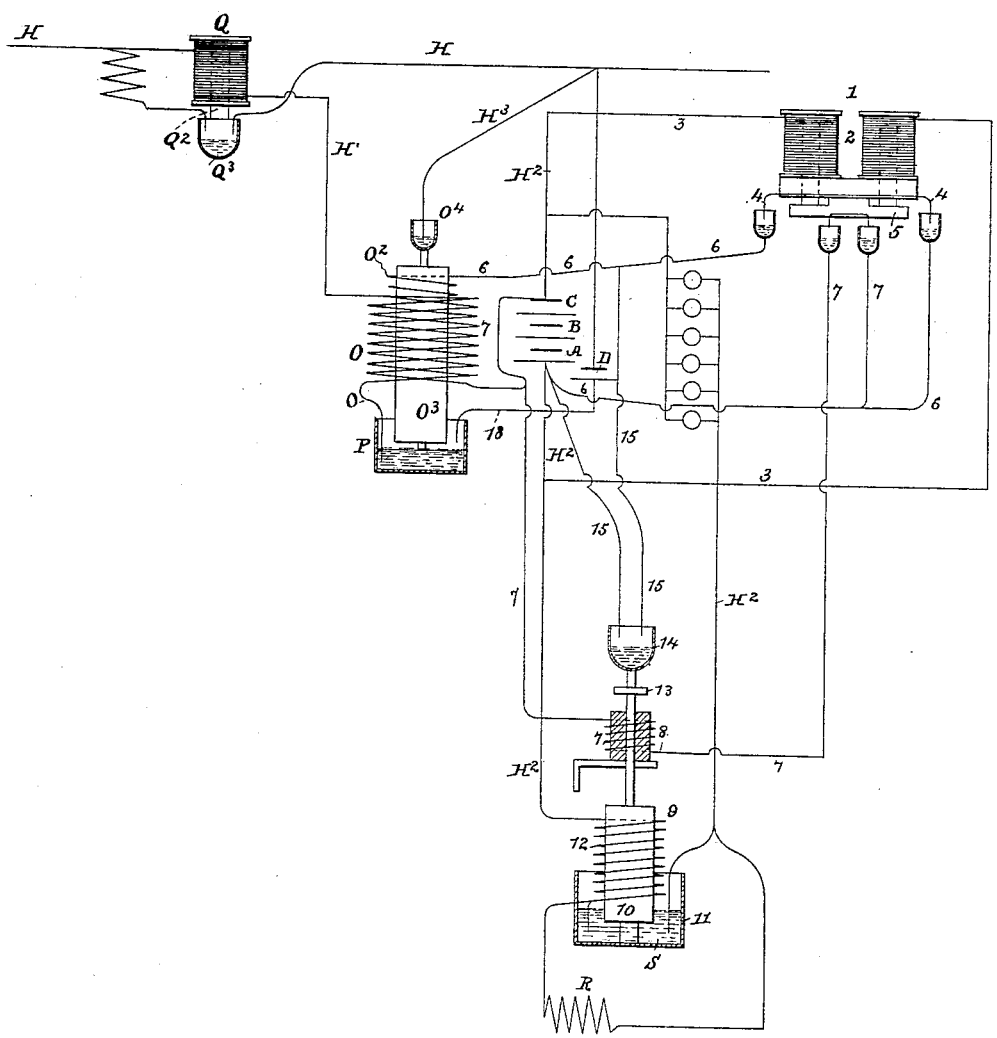

UNITED STATES PATENT OFFICE.

HENRY EDMUNDS, OF LONDON, ENGLAND.

DISTRIBUTION OF ELECTRICITY BY SECONDARY BATTERIES.

SPECIFICATION forming part of Letters Patent No. 393,147, dated November 20, 1888.

Application filed July 16, 1888. Serial No. 280,020. (No model.)

*To all whom it may concern:*

Be it known that I, HENRY EDMUNDS, of London, England, have invented a new and useful Improvement in Systems for the Distribution and Control of Electricity, which improvement is fully set forth in the following specification.

The present invention relates to devices or arrangements for use in electrical-distribution systems; and its object is to insure the proper working of such systems, and particularly to guard against failure of operation thereof under unusual or abnormal conditions.

The present invention was designed more particularly for use in connection with the system described in my application filed June 21, 1888, Serial No. 277,712, in which I have described, without claiming, the arrangements constituting the present invention. The system as therein described contemplates the utilization of secondary or storage batteries to supply the energy required on the local or working circuit, said batteries being periodically charged from a dynamo at the central station, and switch mechanism controlled by timing apparatus, whereby each set or group of batteries is at regular intervals and for equal periods of time transferred from the working to the charging circuit without at any time breaking the latter or causing a fluctuation of the potential of the working-circuit. This general system is in itself sufficient to work efficiently under ordinary conditions of regularity of demand and supply; but in order to render the system capable of general use certain additional safeguards or provisions must be made to provide against possible contingencies and unusual conditions.

According to the above system, the change from the working to the charging circuit and back again goes on continuously; but it is desirable that when the batteries at one point of utilization receive a sufficient charge the entire set of batteries at that point should be cut off from the main circuit until, by use of the energy of the batteries, they may require further charging. Provision should also be made for cutting out the batteries in case the main circuit through the same should be broken, in order that regular working of the system in other points should not be interfered with.

When the batteries are disconnected from the main circuit, they should be reconnected when for any reason their electro-motive force falls below a certain definite limit, and the rate of discharge of the batteries should be so controlled that it may not be permitted to exceed a certain definite limit. When the electro-motive force of the batteries falls, by reason of excessive demand, below a certain definite limit, the discharge therefrom should be stopped or restricted.

The present invention comprises means for carrying out the above provisions; but the invention is not restricted to use in connection with the system described in my application aforesaid, but may obviously be applied to other systems in which installations of secondary batteries are used.

The accompanying drawing represents diagrammatically the arrangements at a point of utilization for carrying out my said invention.

H represents the charging-main; H', the part or branch of the charging-main passing through the storage-battery D; and $H^2$ is the local or working circuit, including the storage-batteries A B C.

Q represents a solenoid included in the charging-main H H'. In the event of a breakage in the portion of the main H' in the house, or of insufficient charging-current at the central station, the magnet Q will cease to be energized and its armature $Q^2$ will fall into the mercury-cup $Q^3$, raising the level of the mercury until it closes the contacts therein, thus providing a path for the charging-current external to the local installation by H $Q^3$ H. The proper working of the system in the event of other contingencies is insured by the action of the voltage-regulator 1, the local-control magnet 9, and the polarized switch, which includes the magnet O and parts connected therewith. The construction and operation of these devices will now be described.

The voltage-regulator 1 consists of an electro-magnet, 2, energized by a shunt, 3, from the local circuit $H^2$. This magnet could be directly in the local circuit, its location in a branch thereof, as shown, being simply a matter of convenience. This electro-magnet operates two contact-bridges, 4 and 5, so arranged that upon a fall of pressure in the local circuit the armature of magnet 2 descending will first make the contact of 4, and upon a further fall will close the circuit controlled by contact-bridge 5. The circuit governed by the bridge 4 is a circuit, 6, from the battery A B C through a fine-wire coil, O², surrounding soft-iron core O³ of the polarized switch, and the circuit 7, governed by the bridge 5, passes from the battery as a fine-wire coil around the upper core, 8, of the local-control magnet 9, and thence to the batteries. The local-control magnet has another core, 10, which forms a plunger in the mercury-cup 11. The return-wire of the local circuit H² from the lamps to the battery is in connection with the mercury in cup 11, and when the level of the mercury is lowered, because of the raising of the plunger 1, either by current in the solenoid in the circuit 7 or by excess of current in the solenoid 12, the local circuit is broken at 11, or it may be diverted through a controlling-resistance, R. The charging-main H' also passes around the core O³ of the polarized switch as a coil, O, wound in the opposite direction to the fine-wire coil O². This wire O dips into the mercury in cup P; thence, if the core O³ be raised, as shown, it passes out through said core, mercury-cup O⁴, and wire H³. If, however, the core O³ be lowered into the mercury-cup P, the contact at O⁴ will be broken and a connection established by the rise of the mercury with a wire, 18, through the battery D.

In the drawing the parts are shown in the position which they occupy when the voltage of the batteries is at a maximum and the local circuit is in normal condition, the circuits 6 and 7 being broken and the charging-current passing around the batteries through H', O, P, O³, O⁴, and H³.

If, now, in the ordinary working of the local installation, the voltage of the batteries has fallen, the armature of magnet 2, carrying bridges 4 and 5, will be lowered until the former closes the circuit 6, circuit 7 remaining open. A current now traverses the coil O² in the opposite direction to that in coil O, which is therefore neutralized, and as a consequence core O³ descends into cup P, raising the level of the mercury therein until contact is made with wire 18 through the battery D, (this being the battery that happens at the moment to be in the charging-circuit,) and at the same time breaking the contact at O⁴. The charging of the battery therefore begins and continues until something occurs to cause another change. For instance, if the potential of the local be raised to a maximum, the armature of magnet 2 will be lifted, breaking circuit 6, and allowing core O³ to be again raised by the energy of coil O, cutting out the battery, as before. The coils O and O² are described as being oppositely wound; but obviously the same result would be obtained by having the coils wound in the same direction and sending a reverse current through coil O².

It is possible that the batteries may be drawn upon for an excessive period and at such a rate that the charging-current is not able to charge at a rate sufficient to check the fall of voltage, which would thus reach a much lower degree than that which has just been considered, whereupon, in addition to the fall of bridge 4, completing circuit through 6, as before, and putting the batteries into charge, bridge 5 will fall to close the circuit 7, the effect being that the upper armature, 8, of the local-control magnet will be raised until, coming against collar 13, it raises also the lower armature, 10, so that the mercury in cup S falls, breaking the local circuit or introducing the controlling-resistance R. The working-circuit is therefore interrupted entirely for a period sufficient to restore the exhausted batteries, when bridge 5 is raised and the local circuit restored, the charging of the batteries, however, continuing, as before, until the energy of magnet 2 is sufficient to raise bridge 4.

In case a consumer at any instant draws on the batteries for a current of, say, twenty ampères, it is desirable at once to put the batteries into charge without waiting for the fall of voltage to operate the voltage-regulator I. This is effected by the operation of the local-control magnet 9 in the following way: Such a current passing through the coil 12, which, as stated, is included in the local H², will cause core 10 to rise, (but not to sufficient extent to break the local through cup S,) closing the circuit 15 by the rise of the cup 14. This circuit 15 is a branch of the circuit 6, and consequently the same effect is produced as by closing the circuit 6—that is to say, the circuit of fine-wire coil O² of the polarized switch is closed, the current of coil O neutralized, core O³ caused to descend into cup P, and the main circuit established through the battery; but if a still greater current be discharged (say eighty ampères) it is desirable not only to put the batteries instantly into charge, but also to break or to include a resistance in the local circuit to induce the user to cease this excessive demand without waiting for the fall of voltage to close circuit 7 through the operation of the voltage-regulator I. The passage of such a current through coil 12 of the local-control magnet raises the core 10 to such an extent as to break the local circuit or introduce a resistance, thus causing interruption or fluctuation in the lights until the consumer ceases this excessive demand. In case of interruption of the charging-circuit and the fall of the plunger Q², as already described, so as to provide a path for the charging-circuit through Q³ exterior to the local installation, the circuit of coil O will of course be broken; but the descent of the core O³ and the back discharge or short-circuiting of the section in the charging-circuit will be prevented by the current in coil O², which will now sustain the core O³.

It is obvious that modifications may be made in the details and arrangements of parts, that other suitable forms of contact could be used instead of the mercury contacts shown for sake of convenience, and that some of the improvements described could be used without the others.

I claim—

1. In a system of electrical distribution, the combination, with the main charging-circuit, a local or working circuit, and secondary batteries, of a switch or circuit-changer comprising a core, a coil included in the main circuit, and another coil included in a normally-open branch of the local circuit, and means for closing said branch circuit when the voltage of the working-circuit falls to a certain limit, thereby operating the switch or circuit-changer and putting the batteries into charge, substantially as described.

2. In a system of electrical distribution, the combination, with the secondary batteries, the main circuit, and the working-circuit, of a switch or circuit-changer comprising a magnet having a coil in the main circuit, whereby the said circuit is diverted from the batteries, and another coil connected with the local circuit, whereby the energy of the first coil can be neutralized or confirmed by a current of the proper direction, substantially as and for the purpose described.

3. In a system of electrical distribution, the combination, with a main and local circuits and secondary batteries for supplying the latter, of an electro-magnetic switch controlling the path of the main circuit to the batteries, a voltage-regulator comprising a magnet in the local circuit, or a branch thereof, and contacts carried by the armature of said magnet for opening and closing the circuit of said switch-magnet and putting the batteries to line upon a fall of voltage in the local, substantially as described.

4. In a system of electrical distribution, the combination, with a main circuit, a local circuit, and secondary batteries for supplying the latter, of a polarized switch controlling the main circuit to the batteries and comprising a magnet having a coil in the main circuit and another coil in the local, and a voltage-regulator whose magnet is in the local or a branch thereof, and whose armature controls the circuit of the last-named coil of the polarized switch, substantially as described.

5. In a system of electrical distribution, the combination, with the main circuit, the local circuit, and secondary batteries for supplying the latter, of an electro-magnetic switch for diverting the main circuit through or around the batteries, a local branch including a coil of said switch-magnet, a voltage-regulator in another local branch, a local-control magnet for breaking or interrupting the local circuit, and two contact-bridges carried by the armature of the voltage-regulator magnet, arranged as specified, so that a fall of voltage will close the local branch and operate said switch to put the batteries in charge, and a further fall will operate said local-control magnet to interrupt or regulate the local supply-circuit, substantially as described.

6. In a system of electrical distribution, the combination, with the main circuit, the local circuit, and secondary batteries for supplying the latter, of a polarized switch whose magnet has one coil in the main and another coil in a branch of the local, a voltage-regulator whose magnet is in a branch of the local, a local-control magnet having two coils, one in the local supply-circuit and one in a branch thereof, and two contact-bridges carried by the armature of the voltage-regulator magnet, the first controlling the branch including polarized switch, the second controlling the branch including the local-control magnet, so that upon a fall of potential in the local the polarized switch will be operated to put the batteries in charge, and upon a further fall the local-control magnet will be energized to interrupt or regulate the local supply-circuit, substantially as described.

7. In a system of electrical distribution, the combination, with the main circuit, the local circuit, and secondary batteries for supplying the latter, of an electro-magnetic switch for controlling the main circuit through the batteries, a local-control magnet included in the local and controlling contacts therein, and a local branch including said electro-magnetic switch having contacts controlled by the armature of said local-control magnet, so that upon a certain amount of current being called for in the local circuit the said switch is instantly operated to put the batteries in charge, substantially as described.

8. In a system of electrical distribution, the combination, with the main circuit, the local circuit, and secondary batteries for supplying the latter, of a switch controlling the main line and having a coil included therein, a local branch including another coil of said switch-magnet, and a local-control magnet in the local supply-circuit adapted upon the passage of a certain current to close said local branch and so operate the polarized switch without disturbing the local supply-circuit, and upon the passage of a still greater current to open or regulate said local circuit while the batteries are being replenished, substantially as described.

9. In a system of electrical distribution, the combination, with the main circuit, local circuit, and secondary batteries for supplying the latter, of a polarized switch comprising a core or plunger, a mercury-cup in which the main line dips after passing through the coil of said magnet, a wire also dipping into said cup and forming a continuation of the main line through the batteries, a coil included in a local branch, and another wire adapted to complete the circuit through said core to the main line, all arranged substantially as described, so that when the core or plunger is raised out of the cup the fall of the mercury therein breaks the main line through the batteries and completes the same through said core, as set forth.

10. In a system of electrical distribution, the combination, with the main circuit, the local circuit, and secondary batteries for supplying the latter, of means for providing a path for the main line around the local installation in case of breakage of the main therein or failure of supply, and for preventing short-circuiting or back discharge from the batteries, said means comprising a magnet included in the main line, and whose armature is adapted, upon failure of energy in said magnet, to close a shunt around the local installation, and a switch-magnet having a coil included in a branch of said local circuit, substantially as described.

11. In an electrical-distribution system, the combination of the following elements: the main circuit, the local circuit, the secondary batteries, a switch having one coil in the main line and another coil in a local circuit having two parallel branches, a voltage-regulator whose armature controls one of said branches and closes the same so as to operate the switch upon a fall of potential in the local supply-circuits, a local-control magnet directly in the local supply-circuit, and whose armature controls the other branch and closes the same, so as to operate the switch when the quantity of current reaches a certain limit, contacts in the local supply-circuit controlled by said local-control magnet, so that said local supply-circuit will be interrupted or regulated when the quantity of current used reaches a certain higher limit, and another local circuit including a coil of said local control-magnet and having contacts controlled by the armature of said voltage-regulator, so that upon a further fall thereof the local-supply circuit will be interrupted or regulated while the batteries are being replenished, substantially as described.

In testimony whereof I have signed this specification in the presence of two subscribing witnesses.

HENRY EDMUNDS.

Witnesses:
 PHILIP MAURO,
 C. J. HEDRICK.